US007027811B2

(12) United States Patent
Pedlar

(10) Patent No.: US 7,027,811 B2
(45) **Date of Patent: *Apr. 11, 2006**

(54) APPARATUS AND METHOD OF UPLINK DATA DURING CELL UPDATE IN UNIVERSAL MOBILE TELECOMMUNICATIONS SYSTEM USER EQUIPMENT

(75) Inventor: David W. Pedlar, Solihull (GB)

(73) Assignee: M-Stack Limited, Birmingham (GB)

( * ) Notice: Subject to any disclaimer, the term of this patent is extended or adjusted under 35 U.S.C. 154(b) by 248 days.

This patent is subject to a terminal disclaimer.

(21) Appl. No.: 10/434,021

(22) Filed: May 8, 2003

(65) Prior Publication Data

US 2004/0224686 A1 Nov. 11, 2004

(51) Int. Cl.
*H04Q 7/20* (2006.01)

(52) U.S. Cl. ................ 455/425; 455/435.1; 455/432.1; 455/452.1; 370/322; 370/329

(58) Field of Classification Search ............. 455/422.1, 455/424–425, 428, 450, 456.1, 458, 502, 455/509, 514, 517, 435.1, 432.1; 370/329, 370/341, 350

See application file for complete search history.

(56) References Cited

U.S. PATENT DOCUMENTS

| | | | | |
|---|---|---|---|---|
| 6,529,497 | B1 * | 3/2003 | Hjelm et al. | 455/450 |
| 2002/0082033 | A1 * | 6/2002 | Lohtia et al. | 455/517 |
| 2002/0107025 | A1 * | 8/2002 | Oliveira | 455/452 |
| 2003/0095538 | A1 * | 5/2003 | Kayama et al. | 370/350 |
| 2003/0119533 | A1 * | 6/2003 | Sarkkinen et al. | 455/500 |
| 2004/0162074 | A1 * | 8/2004 | Chen | 455/437 |
| 2004/0203778 | A1 * | 10/2004 | Kuo et al. | 455/436 |
| 2004/0224669 | A1 * | 11/2004 | Pedlar et al. | 455/412.1 |
| 2004/0224683 | A1 * | 11/2004 | Pedlar et al. | 455/435.1 |
| 2005/0007990 | A1 * | 1/2005 | Beckmann et al. | 370/349 |
| 2005/0043045 | A1 * | 2/2005 | Cheng et al | 455/502 |
| 2005/0054347 | A1 * | 3/2005 | Kakani | 455/452.1 |

OTHER PUBLICATIONS

Marco Ajmone Marasan, Performance model of handover protocol and buffering policies in mobile wireless ATM network, Jul. 4, 2001.*

(Continued)

*Primary Examiner*—Joseph Feild
*Assistant Examiner*—Kamaran Afshar
(74) *Attorney, Agent, or Firm*—Robert Liang

(57) ABSTRACT

The details of an apparatus and method of uplink data during cell update in universal mobile telecommunications system user equipment are disclosed herein. According to one aspect of the present application, there is provided a user equipment to send uplink data to a UTRAN during a CELL UPDATE. The apparatus has an uplink data saving RRC with an uplink data store to save the uplink data while the CELL UPDATE procedure is ongoing, and a state machine having a Cell FACH state and/or a Cell DCH state. The uplink data saving RRC sends the saved uplink data to the UTRAN via an UPLINK DIRECT TRANSFER when the CELL UPDATE procedure has completed and the state machine enters either Cell FACH or Cell DCH state. According to another aspect of the present application, there is provided a method of sending uplink data to a UTRAN during a CELL UPDATE procedure. The method includes the steps of saving the uplink data while the CELL UPDATE procedure is ongoing and sending the saved uplink data to the UTRAN via an UPLINK DIRECT TRANSFER when the CELL UPDATE procedure is completed and the user equipment is in one of CELL FACH and CELL DCH state.

30 Claims, 4 Drawing Sheets

OTHER PUBLICATIONS

Marsan, et al., Performance Models of Handover Protocols and Buffering Policies in Mobile Wireless ATM Networks, IEEE Transactions on Vehicular Technology, Jul. 4, 2001, pp. 925-941, vol. 50, No. 4.

Universal Mobile Telecommunications System (UTMS); UTRAN Functions, Examples on Signalling Procedures (3GPP TR 25.931 version 5.0.0 Release 5), ETSI TR 125 931 V5.0.0 (Mar. 2002), pp. 1-90.

Universal Mobile Telecommunications System (UMTS); Radio Ressource Control (RRC) protocol specification (3GPP TS 25.331 version 3.10.0 Release 1999), ETSI TS 125 331 V3.10.0 (Mar. 2002), Chapter 8.3,1.2, pp. 133-136.

* cited by examiner

APPARATUS AND METHOD OF UPLINK DATA DURING CELL UPDATE IN UNIVERSAL MOBILE TELECOMMUNICATIONS SYSTEM USER EQUIPMENT

CROSSREFERENCE TO RELATED APPLICATION

N/A

BACKGROUND

1. Technical Field

This application relates to UMTS (Universal Mobile Telecommunications System) in general, and to an apparatus and method of uplink data during cell update in universal mobile telecommunications system user equipment in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, whereas and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device (UE) that complies with the ETSI specifications for the UMTS protocol. If the need arises to transmit data from the UE towards the UTRAN, while a Cell Update is in progress (i.e. a CELL UPDATE message has already been sent to the UTRAN), the data may be lost because the required channels may not be useable. (Cell Update is described in section 8.3.1 of the 3GPP standard 25-331).

Standard document ETSI TS 125 331 v3.10.0 (2002-03) addresses the subject of UMTS RRC (Radio Resource Control) protocol requirements between UTRAN (Universal Terrestrial Radio Access Network) and UE (User Equipment). Although ETSI TS 125 331 describes how the UE should behave during a Cell Update with the UTRAN, the document may not enable the UE for uplink data during a Cell Update in particular.

SUMMARY

The details of an apparatus and method of uplink data during cell update in universal mobile telecommunications system user equipment disclosed herein may enable UE (User Equipment) to send uplink data generally, and to send uplink data during a cell update in particular.

The techniques in the present application describe specific behaviour for the UE in circumstances which could easily arise but which are not currently mandated by the standards.

It is an object of the present application that an apparatus and method of uplink data during cell update in universal mobile telecommunications system user equipment provided in accordance with the present application may enable UE behaviour to be unambiguous regarding uplink data during cell update.

According to one aspect of the present application, there is provided a user equipment apparatus adapted to send uplink data to a UTRAN during a CELL UPDATE, the apparatus comprising an uplink data saving RRC, the uplink data saving RRC comprising: an uplink data store to save the uplink data while the CELL UPDATE procedure is ongoing; and a state machine having at least one of a Cell FACH state and a Cell DCH state; wherein said uplink data saving RRC sends the saved uplink data in said uplink data store to the UTRAN via an UPLINK DIRECT TRANSFER upon the condition that the CELL UPDATE procedure has completed and said state machine has entered one of Cell FACH and Cell DCH state.

According to another aspect of the present application, there is provided a method of sending uplink data to a UTRAN during a CELL UPDATE procedure at a user equipment having a state machine with a CELL FACH and CELL DCH state, the method comprising the steps of: (a) determining that the CELL UPDATE procedure is ongoing; (b) receiving an uplink data request; (c) saving the uplink data while the CELL UPDATE procedure is ongoing; (d) determining that the CELL UPDATE procedure is completed; (e) determining that the user equipment is in one of CELL FACH and CELL DCH state; and (f) sending the saved uplink data to the UTRAN via an UPLINK DIRECT TRANSFER when the CELL UPDATE procedure is completed and the user equipment is in one of CELL FACH and CELL DCH state.

Other aspects and features of the present application will become apparent to those ordinarily skilled in the art upon review of the following description of specific embodiments of an apparatus and method of uplink data during cell update in universal mobile telecommunications system user equipment in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
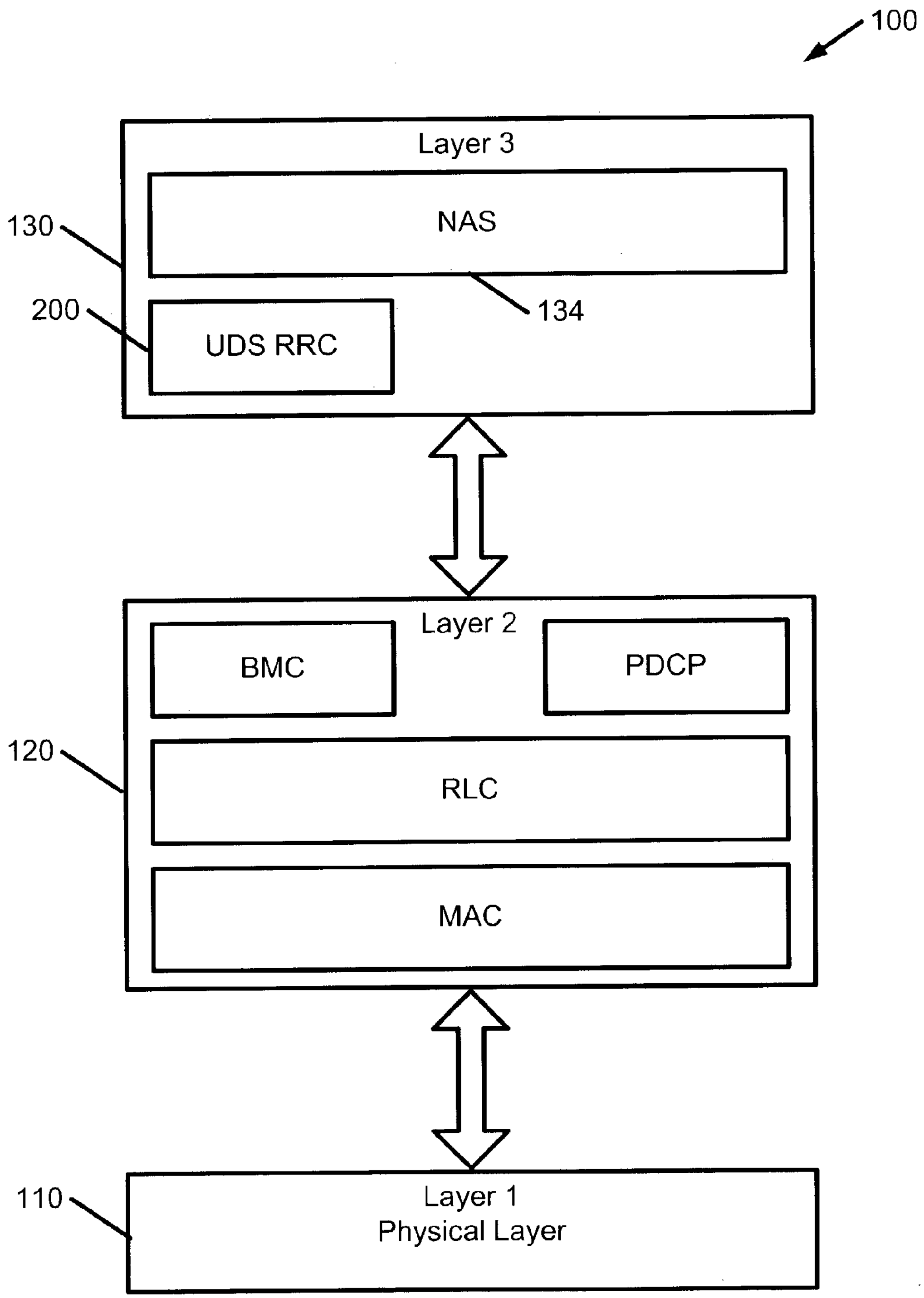
FIG. 1 is a block diagram illustrating an embodiment of a protocol stack apparatus provided with a Uplink Data Saving RRC block, in accordance with the present application.

Referring to the drawings, FIG. 1 is a block diagram illustrating an embodiment of a protocol stack apparatus provided with a Uplink Data Saving RRC block, in accordance with the present application.

The UDS RRC block (Uplink Data Saving RRC) 200 is a sub layer of radio interface Layer 3 130 of a UMTS protocol stack 100. The UDS RRC 200 exists in the control plane only and provides information transfer service to the non-access stratum NAS 134. The UDS RRC 200 is responsible for controlling the configuration of radio interface Layer 1 110 and Layer 2 120. When the UTRAN wishes to change the UE configuration it will issue a message to the UE containing a command to invoke a specific RRC procedure. The UDS RRC 200 layer of the UE decodes this message and initiates the appropriate RRC procedure. Generally when the procedure has been completed (either successfully or not) then the UDS RRC sends a response message to the UTRAN (via the lower layers) informing the UTRAN of the outcome. Although it should be noted that there are a few scenarios where the UDS RRC will not issue a response message to the UTRAN, in those cases the UDS RRC need not and does not reply.

Advantageously, the UDS RRC block 200 allows the protocol stack 100 to behave unambiguously with respect to uplink data during Cell Update.

The UE may assume various states, such as those described in 25-331 clause 7.2. One of the duties of the RRC is to keep track of the state of the UE. In some states shared or common channels are used for communication with the UTRAN. In the cell_DCH state channels dedicated to the UE are used. However, entry to the cell_DCH state requires synchronization to be achieved. Some states, require different Radio Bearer configurations and these are contained in commands received from the UTRAN. In normal operation many UE state transitions are required.

Due to the movement of the UE, various conditions may arise relating to changes in radio reception. These must be notified to the UTRAN, irrespective of the state the UE is in. The conditions may have had an adverse effect on the usability of the channels that were in place previously. Hence the UE must invoke a procedure in which a minimal configuration of Radio Bearers is setup, before informing the UTRAN of what has happened, and waiting for the UTRAN's instructions on how to proceed. This procedure is known as a 'Cell Update'. The Cell Update procedure is described in clause 8.3.1 of 25-331.

The RRC is also responsible for the handling of various circumstances that may arise, which require the UTRAN to be notified. According to clause 8.3.1.2 of 25-331 the UTRAN must be notified of the following events by the 'Cell Update' procedure:

Uplink Data transmission;

Paging;

Re-entering service area;

Radio Link failure;

RLC unrecoverable error;

Cell reselection; and

Periodical cell update.

In the cell_FACH state the UE is identified by a 'Cell Radio Network Temporary Identifier' (C-RNTI). This identifier must be known to the UE in order for it to send Uplink data on the DCCH channel. (See clause 9.2.1.1.c of 25.321 v3.14.0)

The standard mandates that the variable storing this identifier be cleared when the UE leaves the cell_FACH state, or when cell reselection occurs. For this reason, the C-RNTI is usually not available during Cell Update, and hence uplink data cannot be transmitted on the DCCH.

The standard (clause 6.3 of 25-331) requires that data to be sent from the UE NAS to the UTRAN NAS be sent on the DCCH channel. It follows that during Cell Update it may not be possible to send NAS data.

The techniques of the present application solve this problem by saving up NAS data in the UDS RRC until the Cell Update completes.

Figure 2:
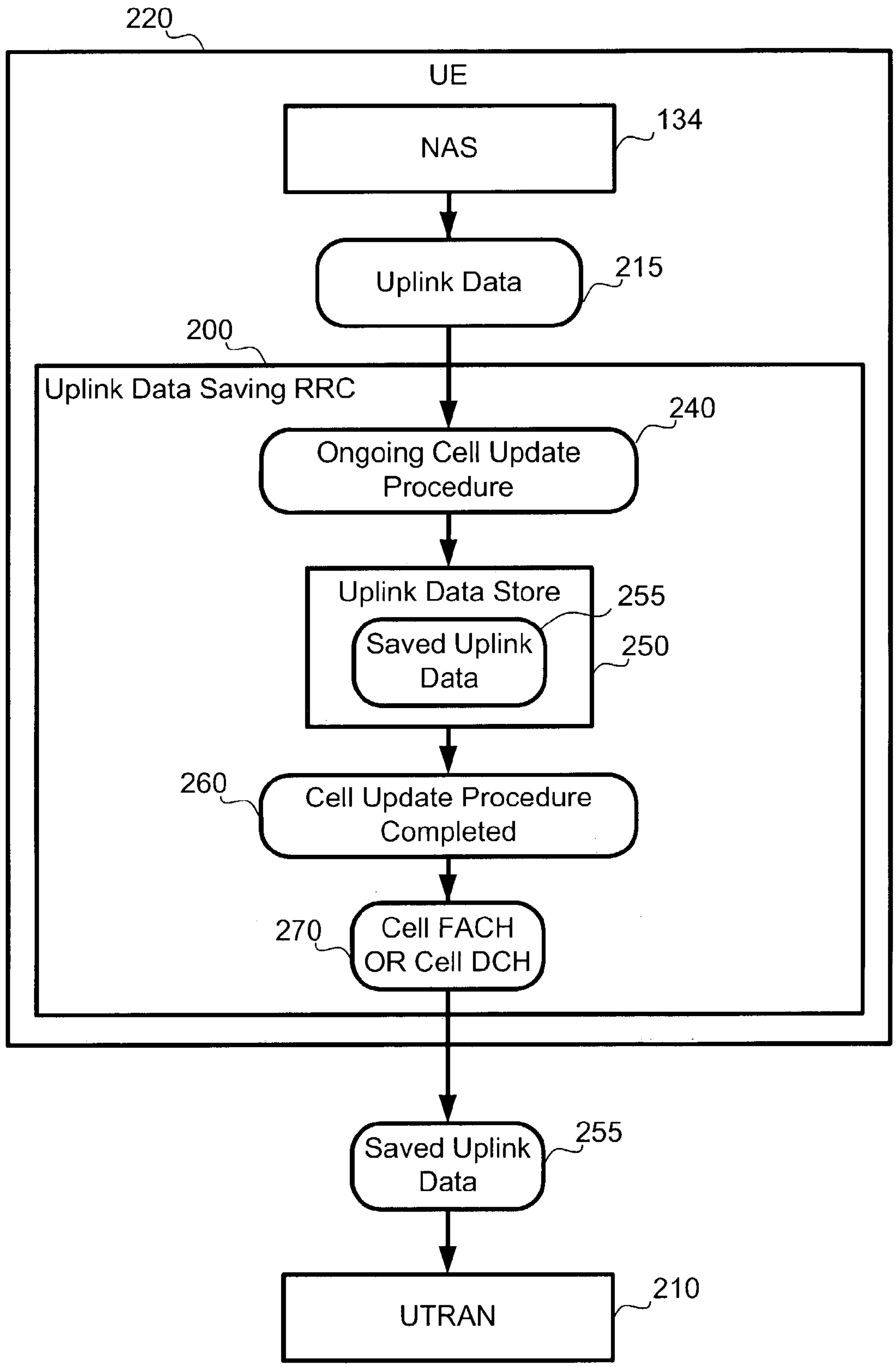
FIG. 2 is a block diagram illustrating in greater detail the UDS RRC block of FIG. 1.

Turning now to FIG. 2, FIG. 2 is a block diagram illustrating in greater detail the UDS RRC block of FIG. 1. UE 220 includes NAS 134 and Uplink Data Saving RRC 200.

The block diagram of FIG. 2 specifies the following behaviour for the UE 220. When uplink data 215 needs to be sent during the Cell Update procedure 240 (i.e. the need to send the data arises once Cell Update has already started.):

(a) The uplink data 215 is to be saved until the Cell Update has completed 260 and the UE is in either cell_FACH or Cell_DCH state 270, at which point the saved uplink data 255 is sent to UTRAN 210.

(b) Although not expressly shown in FIG. 2, optionally, the UTRAN may be notified by sending a CELL UPDATE message with a Cause of 'uplink data transmission'. It is envisaged that the Standard will be updated to unambiguosly specify whether or not this should be sent.

The technique shown in FIG. 2 has the advantage that radio bearers RB3 and RB4 will definitely be available when the attempt to send the data is made.

Figure 3:
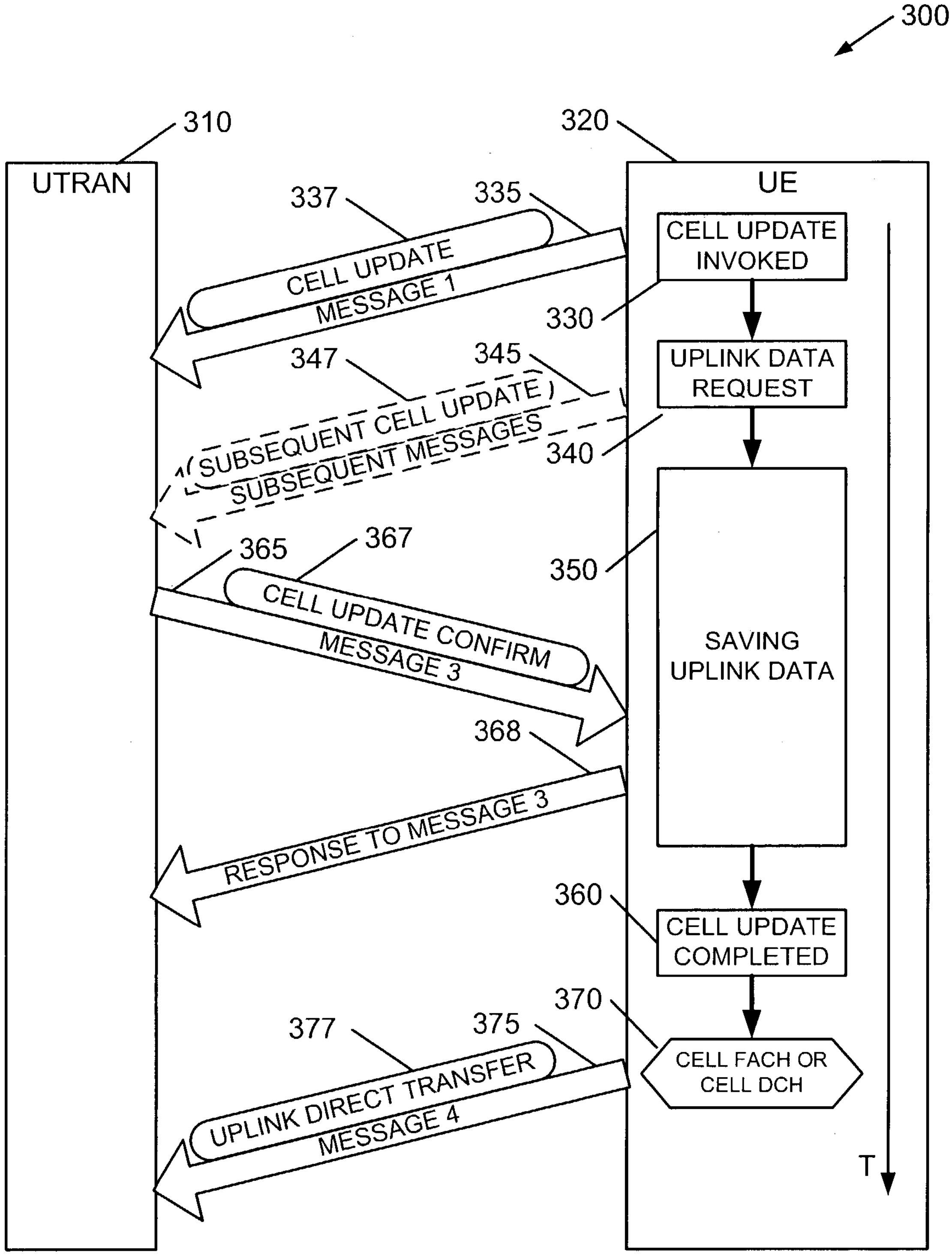
FIG. 3 is an interaction diagram illustrating UDS RRC operation, in accordance with the present application.

Turning now to FIG. 3, FIG. 3 is an interaction diagram illustrating UDS RRC operation, in accordance with the present application. As a consequence of a Cell Update invoked 330 at UE 320, a first CELL UPDATE 337 is sent to UTRAN 310 via 'message 1' 335. Shortly thereafter, an Uplink Data Request 340 occurs, for example if the UE NAS has uplink data that it wishes the UE RRC to send to UTRAN 310. However, since there is an ongoing CELL UPDATE procedure at the UE, advantageously the UE performs the step of saving uplink data 350. Optionally, if zero or more SUBSEQUENT CELL UPDATE 347 is sent to UTRAN 310 via 'subsequent messages' 345 (for example if clause 8.3.1.12 of 25-331 applies), substantially as specified above to notify UTRAN with a Cause of 'uplink data transmission'. Regardless, UTRAN 310 sends a CELL UPDATE CONFIRM 367 via 'message 3' 365, upon reception of which UE 320 sends back a response via 'response to message 3' 368. At some point after this, the ongoing CELL UPDATE COMPLETED 360, and the UE 320 enters one of CELL FACH OR CELL DCH 370 state, and UE 320 advantageously sends an UPLINK DIRECT TRANSFER 377 including the saved uplink data, via 'message 4' 375 to UTRAN 310.

Figure 4:
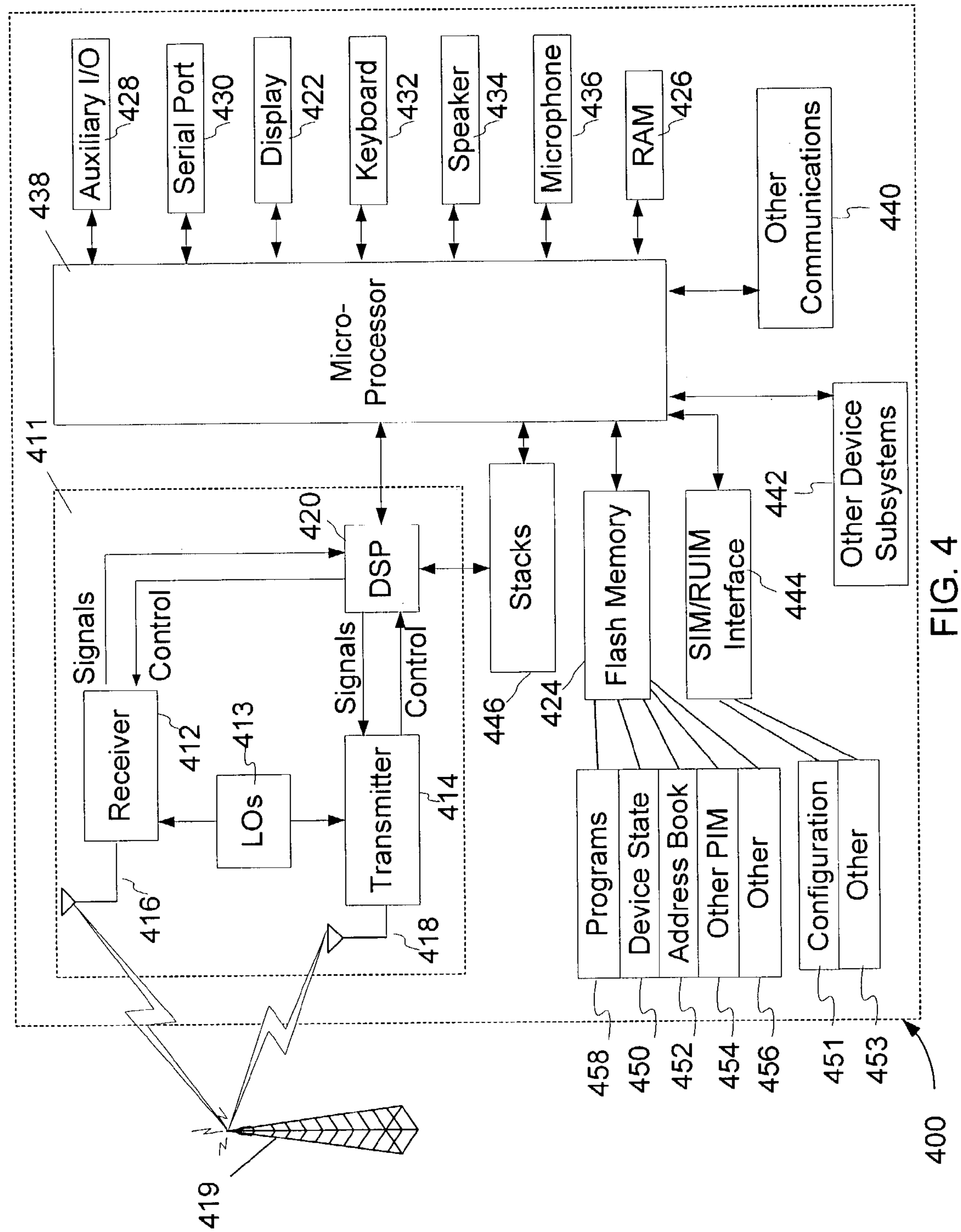
FIG. 4 is a block diagram illustrating a mobile device, which can act as a UE and cooperate with the apparatus and methods of FIGS. 1 to 3.

Turning now to FIG. 4, FIG. 4 is a block diagram illustrating a mobile device, which can act as a UE and co-operate with the apparatus and methods of FIGS. 1 to 3, and which is an exemplary wireless communication device. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the Mobitex™ mobile communication system, the DataTAC™ mobile communication system, GPRS network, UMTS network, EDGE network.

Network access requirements will also vary depending upon the type of network 419. For example, in the Mobitex and DataTAC networks, mobile station 400 is registered on the network using a unique identification number associated with each mobile station. In UMTS and GPRS networks, however, network access is associated with a subscriber or user of mobile station 400. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 400 will be unable to carry out any other functions involving communications over the network 400. The SIM interface 444 is normally similar to a card-slot into which a SIM card can be inserted and ejected like a diskette or PCMCIA card. The SIM card can have approximately 64K of memory and hold many key configuration 451, and other information 453 such as identification, and subscriber related information.

When required network registration or activation procedures have been completed, mobile station 400 may send and receive communication signals over the network 419. Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, keyboard 432, speaker 434, microphone 436, a short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile station user's corresponding data items stored or associated with a host computer system. Further applications may also be loaded onto the mobile station 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4, would normally be implemented in a personal digital assistant (PDA)-type mobile station for which synchronization with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication.

Other communications subsystems 440, such as a short-range communications subsystem, is a further optional component which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

When mobile device 400 is used as a UE, protocol stacks 446 include an apparatus and method of uplink data during cell update in universal mobile telecommunications system user equipment.

Although the terms message, procedure, and command have been specifically used in the above description and the accompanying figures, it is envisaged that either messages, commands, or procedures be handled simultaneously in accordance with the apparatus and methods of the present application, so that these terms can be interchanged without changing the scope or departing from the spirit of the present application.

The above-described, embodiments of the present application are intended to be examples only. Those of skill in the art may effect alterations, modifications and variations to the particular embodiments without departing from the scope of the application.

I claim:

1. A user equipment apparatus adapted to send uplink data to a UTRAN during a CELL UPDATE, the apparatus comprising an uplink data saving RRC, the uplink data saving RRC comprising:

an uplink data store to save the uplink data while the CELL UPDATE procedure is ongoing; and a state machine having at least one of a Cell FACH state and a Cell DCH state;

wherein said uplink data saving RRC sends the saved uplink data in said uplink data store to the UTRAN via an UPLINK DIRECT TRANSFER upon the condition that the CELL UPDATE procedure has completed and said state machine has entered one of Cell FACH and Cell DCH state.

2. The user equipment as recited in claim 1, wherein the CELL UPDATE procedure is caused to become ongoing by Uplink Data transmission.

3. The user equipment as recited in claim 1, wherein the CELL UPDATE procedure is caused to become ongoing by Paging.

4. The user equipment as recited in claim 1, wherein the CELL UPDATE procedure is caused to become ongoing by Re-entering service area.

5. The user equipment as recited in claim 1, wherein the CELL UPDATE procedure is caused to become ongoing by Radio Link failure.

6. The user equipment as recited in claim 1, wherein the CELL UPDATE procedure is caused to become ongoing by RLC unrecoverable error.

7. The user equipment as recited in claim 1, wherein the CELL UPDATE procedure is caused to become ongoing by Cell reselection.

8. The user equipment as recited in claim 1, wherein the CELL UPDATE procedure is caused to become ongoing by Periodical cell update.

9. The user equipment as recited in claim 1, wherein the CELL UPDATE procedure notifies the UTRAN by sending a CELL UPDATE message with a Cause of 'uplink data transmission'.

10. The user equipment as recited in claim 1, wherein said state machine further comprises an Idle state whereat the user equipment waits for a 'Signalling Connection establishment request'.

11. The user equipment as recited in claim 1, wherein said state machine further comprises a Connected state containing said at least one of Cell FACH and Cell DCH states, whereat the user equipment remains upon reception of an RRC CONNECTION SETUP, and whereat the state transitions to said Idle state upon one of the reception of an RRC CONNECTION RELEASE, an error at the user equipment, and other events which cause a transition to said Idle state.

12. The user equipment as recited in claim 11, wherein said state machine further contains a Cell PCH state.

13. The user equipment as recited in claim 11, wherein said state machine further contains a URA PCH state.

14. The user equipment as recited in claim 1, wherein the radio bearer RB3 is available when the attempt to send the data is made.

15. The user equipment as recited in claim 1, wherein the radio bearer RB4 is available when the attempt to send the data is made.

16. A method of sending uplink data to a UTRAN during a CELL UPDATE procedure at a user equipment having a state machine with a CELL FACH and CELL DCH state, the method comprising the steps of:

(a) determining that the CELL UPDATE procedure is ongoing;

(b) receiving an uplink data request;

(c) saving the uplink data while the CELL UPDATE procedure is ongoing;

(d) determining that the CELL UPDATE procedure is completed;

(e) determining that the user equipment is in one of CELL FACH and CELL DCH state; and (f) sending the saved uplink data to the UTRAN via an UPLINK DIRECT TRANSFER when the CELL UPDATE procedure is completed and the user equipment is in one of CELL FACH and CELL DCH state.

17. The method as recited in claim 16, wherein the CELL UPDATE procedure is caused to become ongoing by Uplink Data transmission.

18. The method as recited in claim 16, wherein the CELL UPDATE procedure is caused to become ongoing by Paging.

19. The method as recited in claim 16, wherein the CELL UPDATE procedure is caused to become ongoing by Re-entering service area.

20. The method as recited in claim 16, wherein the CELL UPDATE procedure is caused to become ongoing by Radio Link failure.

21. The method as recited in claim 16, wherein the CELL UPDATE procedure is caused to become ongoing by RLC unrecoverable error.

22. The method as recited in claim 16, wherein the CELL UPDATE procedure is caused to become ongoing by Cell reselection.

23. The method as recited in claim 16, wherein the CELL UPDATE procedure is caused to become ongoing by Periodical cell update.

24. The method as recited in claim 16, wherein the CELL UPDATE procedure notifies the UTRAN by sending a CELL UPDATE message with a Cause of 'uplink data transmission'.

25. The method as recited in claim 16, wherein the state machine further comprises an Idle state whereat the user equipment waits for a 'Signalling Connection establishment request'.

26. The method as recited in claim 16, wherein the state machine further comprises a Connected state containing said at least one of Cell FACH and Cell DCH states, whereat the user equipment remains upon reception of a RRC CONNECTION SETUP, and whereat the state transitions to said Idle state upon one of the reception of a RRC CONNECTION RELEASE, an error at the user equipment, and other events which cause a transition to said Idle state.

27. The method as recited in claim 26, wherein said state machine further contains a Cell PCH state.

28. The method as recited in claim 26, wherein said state machine further contains a URA PCH state.

29. The method as recited in claim 16, wherein the radio bearer RB3 is available when the attempt to send the data is made.

30. The method as recited in claim 16, wherein the radio bearer RB4 is available when the attempt to send the data is made.

* * * * *